(12) United States Patent
Gatton et al.

(10) Patent No.: US 7,140,949 B2
(45) Date of Patent: Nov. 28, 2006

(54) TOOL AND PROCESS FOR CHROME PLATING A VEHICLE WHEEL SURFACE

(75) Inventors: Geoffrey L. Gatton, Farmington, MI (US); Richard T. Guernsey, Evansville, IN (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 11/110,650

(22) Filed: Apr. 20, 2005

(65) Prior Publication Data

US 2006/0040592 A1    Feb. 23, 2006

Related U.S. Application Data

(60) Continuation of application No. 10/756,856, filed on Jan. 14, 2004, now Pat. No. 6,893,330, which is a continuation-in-part of application No. 10/309,726, filed on Dec. 4, 2002, now Pat. No. 6,733,366, which is a division of application No. 09/725,528, filed on Nov. 29, 2000, now Pat. No. 6,540,450.

(60) Provisional application No. 60/450,013, filed on Feb. 26, 2003, provisional application No. 60/440,914, filed on Jan. 17, 2003.

(51) Int. Cl.
*B24B 1/00*    (2006.01)
*B24B 21/00*   (2006.01)

(52) U.S. Cl. .................. 451/41; 451/312; 451/319; 451/324; 451/397; 451/398; 451/403; 451/540; 451/552; 407/42; 407/113; 407/114; 407/115; 407/116

(58) Field of Classification Search .............. 451/41, 451/312, 319, 324, 397, 398, 403, 540, 552; 407/42, 113, 114, 115, 116
See application file for complete search history.

(56) References Cited

U.S. PATENT DOCUMENTS

| 2,977,669 | A | 4/1961 | Chambers |
| 3,289,271 | A | 12/1966 | Stier |
| 3,760,660 | A | 9/1973 | Van Arnam et al. |
| 4,118,846 | A | 10/1978 | Korte |
| 4,189,264 | A | 2/1980 | Kraemer |
| 4,835,826 | A | 6/1989 | Wilson |
| 4,898,499 | A | 2/1990 | Tsujimura et al. |
| 4,929,315 | A | 5/1990 | Schaper et al. |
| 4,990,036 | A | 2/1991 | Eklundo et al. |
| 5,017,055 | A | 5/1991 | Tsujimura et al. |
| 5,099,558 | A | 3/1992 | Wilson |
| 5,329,684 | A | 7/1994 | Budet et al. |
| 5,383,526 | A | 1/1995 | Brady |

(Continued)

FOREIGN PATENT DOCUMENTS

DE    31 18 266    11/1982

(Continued)

*Primary Examiner*—Joseph J. Hail, III
*Assistant Examiner*—Shantese McDonald
(74) *Attorney, Agent, or Firm*—MacMillan, Sobanski & Todd, LLC

(57) ABSTRACT

A cutting tool having a crystalline tip is pressed with a uniform pressure against the outboard surface of a vehicle wheel as the wheel is rotated. The smoothed wheel surface is then chrome plated to provide a cosmetic finish to the wheel face.

25 Claims, 8 Drawing Sheets

U.S. PATENT DOCUMENTS

| | | | |
|---|---|---|---|
| 5,486,073 A * | 1/1996 | Satran et al. | 407/113 |
| 5,486,137 A | 1/1996 | Flood et al. | |
| 5,494,477 A | 2/1996 | Flood et al. | |
| 5,531,024 A | 7/1996 | Lowe et al. | |
| 5,643,055 A | 7/1997 | Linzell | |
| 5,728,426 A | 3/1998 | Wei | |
| 5,771,763 A | 6/1998 | Naslund et al. | |
| 5,803,553 A | 9/1998 | Wei | |
| 5,951,215 A | 9/1999 | Paya et al. | |
| 6,065,377 A | 5/2000 | Harada et al. | |
| 6,082,936 A | 7/2000 | Moriguchi et al. | |
| 6,113,319 A * | 9/2000 | Hansson et al. | 407/66 |
| 6,155,755 A | 12/2000 | Kanada et al. | |
| 6,220,795 B1 | 4/2001 | Matthews | |
| 6,241,430 B1 | 6/2001 | Norström | |
| 6,315,502 B1 | 11/2001 | Maurer | |
| 6,447,852 B1 * | 9/2002 | Gordeev et al. | 427/577 |
| 6,533,506 B1 * | 3/2003 | Hite | 408/153 |
| 6,609,859 B1 | 8/2003 | Sjöö | |

FOREIGN PATENT DOCUMENTS

| | | |
|---|---|---|
| DE | 100 34 228 | 2/2001 |
| EP | 0 313 534 | 4/1989 |
| EP | 0 638 383 | 2/1995 |
| EP | 1 211 025 | 6/2002 |
| GB | 2 339 713 | 2/2000 |
| JP | 08 118104 | 5/1996 |
| JP | 2000 127702 | 5/2000 |
| WO | 98/41360 | 9/1998 |
| WO | 01/32339 | 5/2001 |

* cited by examiner

TOOL AND PROCESS FOR CHROME PLATING A VEHICLE WHEEL SURFACE

CROSS REFERENCE TO RELATED APPLICATIONS

This application is a Continuation of application U.S. patent application Ser. No. 10/756,856 filed Jan. 14, 2004, now U.S. Pat. No. 6,893,330, which claimed the benefit of U.S. Provisional Patent Application No. 60/440,914 filed on Jan. 17, 2003, and of U.S. Provisional Patent Application No. 60/450,013 filed on Feb. 26, 2003, for the new matter contained therein and which was a Continuation-in Part of U.S. patent application Ser. No. 10/309,726 filed Dec. 4, 2002, now U.S. Pat. No. 6,733,366, which was a divisional of U.S. patent application Ser. No. 09/725,528 filed on Nov. 29, 2000, now U.S. Pat. No. 6,540,450, and claimed the benefit of U.S. Provisional Patent Application No. 60/246,663 filed on Nov. 8, 2000.

BACKGROUND OF INVENTION

This invention relates in general to vehicle wheels and in particular to a method and cutting tool for machining a portion of the vehicle wheel outboard face to produce a smooth surface and then chrome plating the smooth surface.

Vehicle wheels typically include an annular wheel rim and a circular wheel disc. The wheel disc can be formed across the outboard end of the wheel rim or recessed within the wheel rim. The wheel rim is adapted to carry a pneumatically inflated tire. The wheel rim has inboard and outboard tire retaining flanges formed on the ends thereof which extend in an outward radial direction to retain the tire on the wheel. Inboard and outboard tire bead seats are formed on the outer surface of the wheel rim adjacent to the corresponding tire retaining flange to support the tire wall beads and form an air-tight seal therewith. The wheel rim also includes a reduced diameter deep well between the tire bead seats to facilitate mounting the tire upon the wheel.

The wheel disc includes a central wheel hub for mounting the wheel upon a vehicle. The inboard face of the wheel disc hub is typically machined to form a flat surface to assure good contact between the wheel disc and the vehicle wheel hub. A pilot hole and a plurality of wheel stud holes extend through the wheel hub. The pilot hole is centered on the hub and the stud holes are spaced equally about a bolt hole circle which is concentric with the pilot hole. The pilot hole can receive the end of an axle while the wheel stud holes receive wheel studs for attaching the wheel to the vehicle. The wheel disc also typically includes a plurality of wheel spokes which extend radially from the wheel hub to the wheel rim and support the hub within the rim.

Referring now to the drawings, a flow chart for a wheel manufacturing process is shown in FIG. 1. In functional block 10, a wheel is cast in a single piece from a light weight metal such as aluminum, magnesium or titanium, or an alloy of a light weight metal. Such wheels are becoming increasingly popular because they weigh less than conventional steel wheels and can include outboard wheel disc faces which are formed in a pleasing aesthetic shape. One piece wheel castings are usually formed by a gravity or low pressure casting process. The wheel castings are finished by machining to a final shape.

Two separate machining stations are typically used to finish a wheel casting. In functional block 11, the outboard end of a rough wheel casting is clamped to the face of a first wheel lathe for a first set of machining operations. A wheel lathe is a dedicated machine designed to finish wheels. Wheel lathes typically include a plurality of cutting tools mounted upon a lathe turret. The turret is indexed to sequentially move each of the tools to the surface of the wheel casting. Wheel lathes are usually operated under Computer Numerical Control (CNC) to sequentially perform a number of related machining operations. For example, a wheel lathe turret can be equipped with a turning tool, a facing tool and a drill bit and the wheel lathe can be programmed to sequentially turn, face and bore a wheel casting. The wheel lathe face typically includes a chuck having a plurality of jaws which grip the outboard wheel retaining flange and tire bead seat. Consequently, the outboard wheel rim end is not finished during the first set of machining operations.

The outside and inside surfaces of the wheel rim are turned to their final shapes and the inboard surface of the wheel hub is faced in functional block 12. Additionally, the inboard end of the wheel rim is finished. The partially finished wheel casting is removed from the first wheel lathe, reversed and clamped on a second wheel lathe for a second set of machining operations in functional block 13. During the second set of machining operations, the inboard wheel flange and tire bead seat are gripped in the jaws of the wheel lathe chuck, exposing the outboard surface of the wheel disc and the outboard end of the wheel rim for machining.

In functional block 14, the second wheel lathe turns and faces the outboard wheel face. During these operations, the outboard tire retaining flange and the outboard tire bead seat also are turned to final shapes. The surface of the hubcap retention area is machined to final shape and the stud mounting holes are drilled through the hub in functional block 15. Alternately, the wheel casting may be removed from the wheel lathe and the drilling operation completed at another work station.

During the facing and other machining operations, very fine grooves are formed in the surfaces of the wheel. Accordingly, the surface of the wheel is typically subjected to a finishing step, as shown in functional block 16. A typical finishing process involves polishing the wheel surface to smooth the grooves and provide a lustrous appearance to the surface of the wheel. The polishing is usually followed by application of a clear coating to protect the polished wheel surface.

A typical polishing and chrome plating operation is illustrated by a flow chart in FIG. 2. Polishing typically involves a first step of rough buffing with an abrasive compound as shown in functional block 20. The buffed wheel is degreased in functional block 21. One frequently used method of degreasing involves passing the wheel through a chamber which is filled with a solvent vapor. The solvent vapor condenses upon wheel, covering the entire wheel surface. Once the solvent has had a sufficient time to dissolve any surface grease, the solvent is washed from the wheel to complete the degreasing. As shown in functional block 22, the wheel is then wet polished with a liquid lubricant for the polishing abrasive. The wheel is usually rotated and rotating polishing wheels are applied to the surface while a slurry of polishing abrasive and a carrier fluid is applied to the wheel surface. Next the wheel is rinsed in functional block 23. Typically, deionized water is used for the rinse.

The substances utilized during wheel polishing are generally toxic in nature. Accordingly, it is common practice to ship the wheels to a polishing contractor who employs safety procedures to protect personnel. The contractor is also equipped to dispose of the toxic wastes generated by the polishing operations.

The polished wheel surface is buffed in functional block 24. Typically, the buffing step utilizes a rag and buffing compound to create a surface smooth and shiny enough to achieve the generally accepted smoothness and clarity required for chrome plating an aluminum wheel. Finally, a layer of chrome plating is applied to the wheel in functional block 25. The chrome plating may be provided at the polishing facility, or the wheel may be shipped to a chrome platter.

SUMMARY OF INVENTION

This invention relates to a method and improved cutting tool for machining the finished a portion of an outboard wheel face to produce a smooth surface and then chrome plating the smooth surface.

As described above, it is known to polish and buff an aluminum wheel surface prior to chrome plating. However, such processes require abrasives and solvents. The polishing and buffing can create slight waves or subtle uniform variations in the polished surface due to harmonic oscillations of the power equipment used and differing amounts of work pressure exerted on the surface due to different elevations of the geometric designs of the wheel surface. When polishing and buffing is done by hand, the variations are more random due to fatigue of the human muscles and the inability to make exact dimensional repeated motions. Thus, conventional polishing and buffing methods are known to produce a slightly distorted reflection that is similar to looking through an antique glass pane that has experienced some flow of its molecular structure. Such flow can cause a certain amount of refraction or deflection of the light rays passing through the glass. Therefore, it would be desirable to provide a process for smoothing a wheel surface that does not require conventional polishing and buffing.

Furthermore, typical solvents include trichloroethylene, trichloroethane, sulfuric acid and perchloroethylene, which are toxic. Additionally, the lubricants for the abrasives can include animal lubricants such as grease and lard. The polishing wheels can produce air-borne lint during the polishing and buffing operation. Accordingly, it is necessary to protect the workers from these materials and collect and dispose of the residues. Because of the complexity of the polishing operations and the need to appropriately control the environmental impact of the materials utilized, wheels are often shipped to an outside contractor for polishing. This involves additional time and expense. Thus, it would be desirable to smooth the wheel face without polishing the wheel.

The present invention contemplates a vehicle wheel comprising an annular wheel rim portion and a wheel disc formed across the wheel rim. The wheel disc has an outboard face which includes a smoothed portion to provide a pleasing cosmetic appearance. It is further contemplated that the smoothed portion of the wheel disc face can extend over the entire surface of the wheel disc outboard face. An optional protective coating can be formed over the smoothed portion of the wheel disc face.

The present invention further includes a process for forming a decorative surface upon a vehicle wheel face which comprises providing a machined vehicle wheel including a wheel rim and having a wheel disc extending radially across the wheel rim. The machined wheel is mounted in a lathe. The wheel is rotated while an improved cutting tool having a hardened tip is urged with a uniform cutting pressure against the outboard surface of the wheel disc to smooth at least a portion of the wheel disc surface.

In the preferred embodiment, the hardened tip is formed upon an insert of poly or mono crystalline material that is mounted on one end of the cutting tool. The invention also contemplates smoothing the entire outboard face of the wheel disc. Subsequent to smoothing the wheel face, the smoothed portion of wheel face is chrome plated.

Various objects and advantages of this invention will become apparent to those skilled in the art from the following detailed description of the preferred embodiment, when read in light of the accompanying drawings.

DETAILED DESCRIPTION

Figure 3:
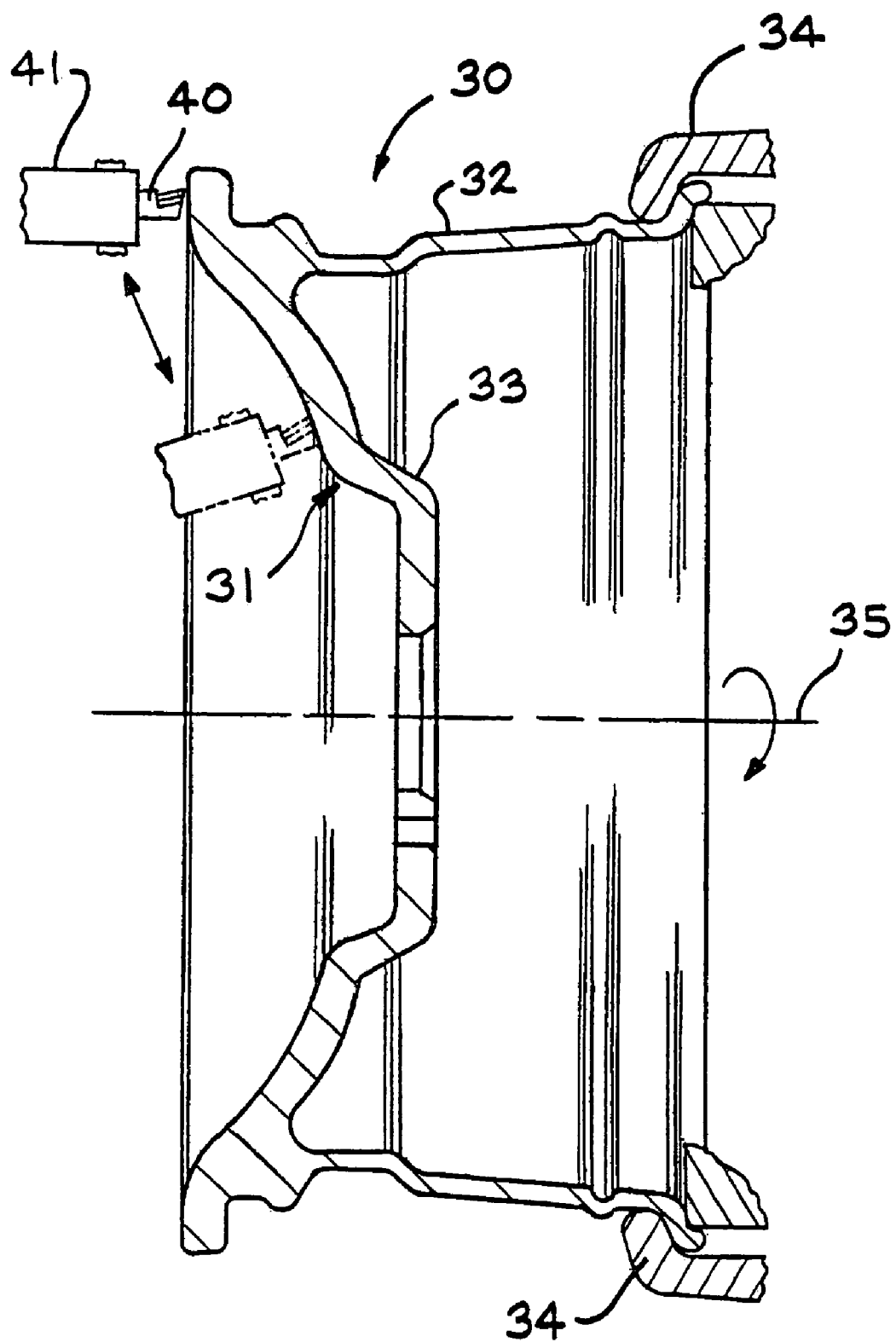
FIG. 3 is a sectional view of a vehicle wheel and illustrates a process for finishing the vehicle wheel face in accordance with the invention.

Referring again to the drawings, there is illustrated in FIG. 3, a sectional view of a one piece wheel 30 having an outboard surface 31 and a process for finishing the wheel 30 in accordance with the present invention. The finishing involves cutting the wheel surface 31 with an improved cutting tool having a unique geometry that will be described below. An increased brightness or shine of the wheel surface is expected from the cutting process. Thus, the present invention is directed to smoothing the visible portions of a wheel face to cosmetically improve the appearance of the wheel face.

As shown in FIG. 3, the wheel 30 includes an annular wheel rim 32. A wheel disc 33 which includes the outboard surface 31 extends radially across the outboard end of the wheel rim 32. The invention contemplates mounting an inboard end of the wheel rim 32 in the jaws 34 of a lathe or a spinner chuck of a wheel lathe (not shown).

The wheel 30 is rotated about an axis 35, as shown by the arrow in FIG. 3, by the wheel lathe. An improved cutting tool 40 is mounted upon a tool holder 41 that is secured to a wheel lathe turret (not shown). The wheel lathe urges the cutting tool 40 against the outboard wheel face 31 with uniform or equalized cutting pressure to simultaneously remove material from the wheel face 31 and smooth the cut surface. In the preferred embodiment, programmable machine tools are utilized to assure that the cutting pressure is equalized for all elevations of the geometric shape of the wheel being finished. The tool 40 is traversed in a radial direction from the outboard end of the wheel rim 32 across the wheel face 31. The tool 40 moves alternately toward and away from the center of the wheel disc 33, as shown by the small arrows in FIG. 3. As the tool 40 moves across the wheel face 31, the tool 40 also is moved axially to follow the contour of the wheel face 31. The invention further contemplates that the improved cutting tool 40 can be inclined to smooth all possible inclinations of the wheel face 31, such as horizontal, vertical or inclined, as illustrated in phantom in FIG. 3. Additionally, the tool 40 can be advanced in an axial, or radial, direction to increase the amount of material removed from the wheel face 31. Liquid coolant is applied to the working surface by a conventional supply means (not shown). As will be described below, a portion of the surface of the wheel face 31 is melted and then resolidified as the tool 40 passes thereover to form a smoothed portion of the wheel face 31.

Figure 4:
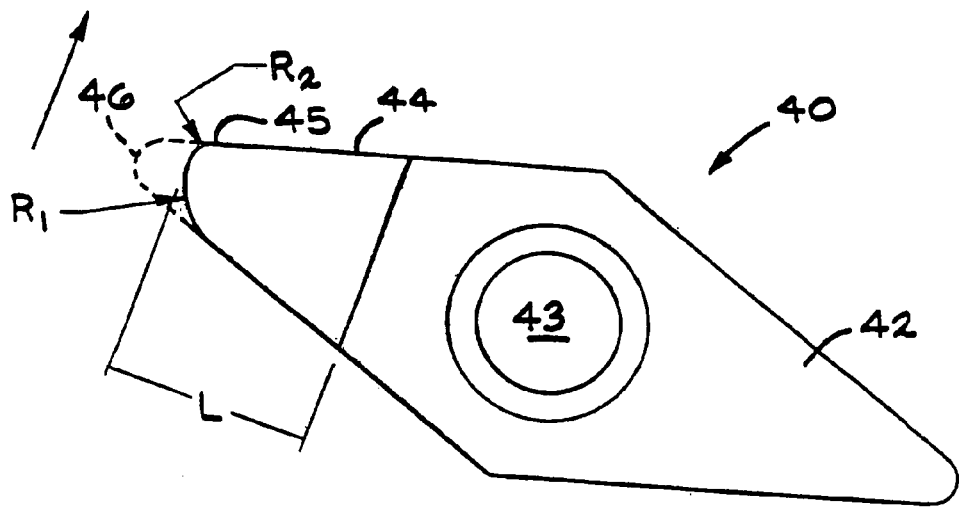
FIG. 4 is a plan view of a wheel surface finishing tool in accordance with the invention that is used in the finishing process illustrated in FIG. 3.
Figure 5:
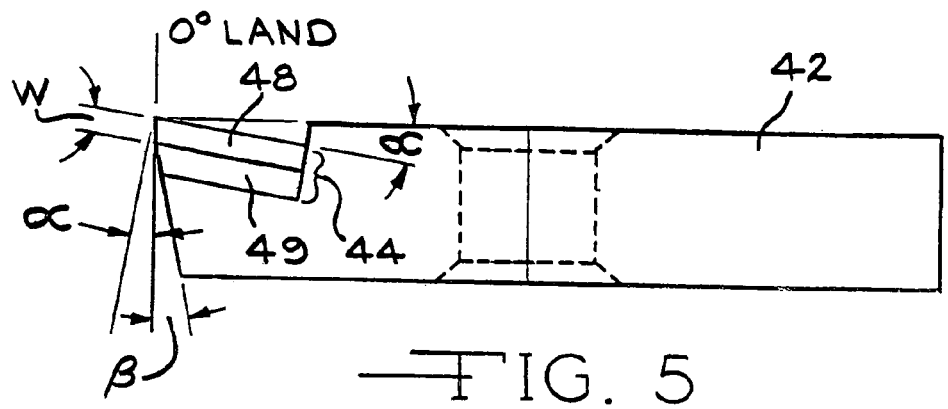
FIG. 5 is a side elevation of the surface finishing tool shown in FIG. 4.

As shown in FIGS. 4 and 5, the improved cutting tool 40 is a specially modified face cutting tool. The tool 40 has a rhombic shaped body 42 having a bore 43 formed therethrough which receives a fastener (not shown) for securing the tool to the tool holder 41. The tool 40 is formed from a sintered carbide steel and includes an insert 44 insert attached to one end. The insert 44 is formed from a poly crystalline material which may be either naturally occurring or synthetically produced. In the preferred embodiment, the insert 44 is formed from a Poly Crystalline Diamond (PCD) material. The insert 44 includes an improved cutting tip 45 on one end that contacts the wheel face 31 and works the metal. The arrow in the upper left portion of FIG. 4 indicates the direction of movement of the worked metal relative to the cutting tool 40. The insert 44 has a length L of about six mm.

The invention also contemplates applying a polycrystalline coating to a substrate to form the tool insert (not shown). The inventors believe that either a diamond or ceramic coating may be utilized. The coating would be applied either before or after the geometry of the cutting tip is formed.

The present invention contemplates a special geometry for the cutting tip 45. For comparison, a standard cutting tip is outlined by the dashed line labeled 46 in FIG. 4. While the standard cutting tip 46 is symmetrical about the centerline of the tool, the cutting tip 45 of the improved tool 40 is non-symmetrical, having two different radii. The leading edge of the tip 45 has a larger radius $R_1$ while the trailing edge of the tip 45 has a smaller radius $R_2$. Both radii $R_1$ and $R_2$ are perpendicular to the centerline of the tool 40. In the preferred embodiment, the leading edge radius $R_1$ is twice the trailing edge radius $R_2$. Additionally, the leading edge radius $R_1$ is selected to be greater that the rate of feed per revolution programmed into the wheel lathe to cause multiple cutting of the wheel surface prior to the tangent point of the tip 45. In the preferred embodiment, the leading edge radius $R_1$ is 3.01 mm while the trailing edge radius $R_2$ is 1.5 mm. These radii compare to a typical standard cutting tip radius of 1.0 mm. The direction of movement of the wheel being worked is indicated by the arrow in FIG. 4.

Figure 6:
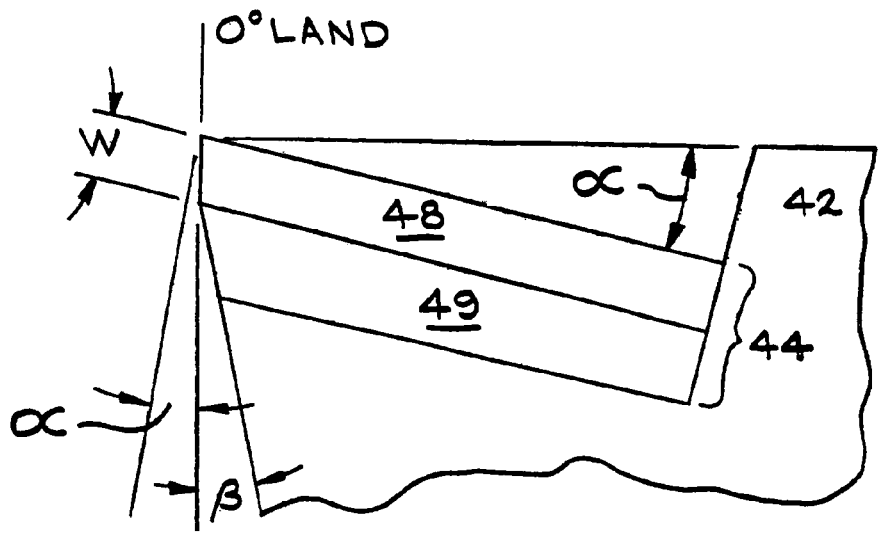
FIG. 6 is an enlarged partial side elevation of the tool shown in FIG. 5.

As best seen in FIGS. 5 and 6, the insert 44 is canted at an angle $\alpha$ relative to the top surface of the tool body 42. In the preferred embodiment, the angle $\alpha$ is seven degrees. A flat land 48 is formed around the upper edge of the insert 44. The land 48 is perpendicular, or has zero rake, to the top surface of the tool body 42. Because the insert 44 is canted relative to the tool body 42, the cutting edge of the insert 44 also forms an angle of $\alpha$ with the tool body top surface. Thus, the cutting edge of the insert 44 is maintained tangent to the surface of the face of the vehicle wheel. The land 48 has a width W that is in the range of between 0.076 and 0.254 mm with the preferred embodiment having a width in the range of 0.076 to 0.127 mm. The lower portion 49 of the insert 44 and the tool body 42 are undercut at an angle $\beta$ to allow removal of the cut material. The angle $\beta$ is in the range of five to 15 degrees and is five degrees in the preferred embodiment.

The tool holder 41 is of conventional design but is formed of an anti-vibration material, such as, for example, machinable carbide to minimize vibration by avoiding resonance. Also, the tool holder 41 is designed for a minimum extension from the wheel lathe turret to increase the rigidity of the smear cutting tool 40. Additionally, it is contemplated that the associated wheel lathe includes a balanced chuck, centering, locating and clamping mechanisms.

During operation, the zero rake land of the insert tip 44 rubs the wheel surface causing "work hardening" of the wheel metal. This differs from a process commonly referred to as "smear cutting" where a tool is dragged in a "backward" direction over the workpiece to only smooth the surface. The present invention contemplates advancing the tool 40 in a "forward" direction. The unique geometry of the improved cutting tool tip 45 simultaneously removes material from the wheel face and smoothes the wheel face. In the preferred embodiment, the depth of material removed by the tool 40 is within the range of 0.05 mm to 0.1 mm. The friction between the tool tip 45 and the wheel surface generates sufficient heat to cause microscopic melting of the surface metal. The friction between the tool tip 45 and the wheel surface forces a small amount of the melted metal in front of the tip 45 and into any surface voids. The melted surface metal then resolidifies. The melting and resolidification of the metal can leave a bright surface that appears to have been polished.

The inventors believe that as a wheel solidifies following casting, a layer of oxidized metal is formed upon the surface of the wheel. The oxidized layer is melted and quickly resolidifed during the cutting process with the improved cutting tool 40. As a result, an oxidized layer does not have a chance to be formed. A similar process is utilized to provide a lustrous surface finish to gold ingots. As a gold ingot solidifies, the exterior surface becomes dull due to slight oxidation of the gold on the surface and impurities rising to the surface. A torch is used to heat and remelt the surface of the ingot to a semi-liquid state. The torch is quickly removed as soon as the ingot surface becomes shiny. This process for gold ingots is typically referred to as tinning. The inventors have found that if the feedrate for the improved tool 40 is one tenth or less than the leading edge radius $R_1$, the surface appears to have been polished. The finishing process also seals any pores that could allow air to escape from a pneumatic tire mounted upon the wheel. Accordingly, the inventors expect that the number of "leakers" will be reduced.

The invention further contemplates applying a layer of chrome plating 50 to the wheel disc face following the work hardening process. The layer of chrome plating 50 covers the smoothed portion of the wheel and provides an esthetically pleasing appearance. The inventors have found that the smoothing of the wheel surface described above eliminates the harmonically distorted pressures experienced with conventional polishing and buffing processes. Additionally, there is minimal wave effect in the wheel surface and the geometric edges of the wheel face are not rounded or softened by the abrasive effects of conventional polishing and buffing operations. The inventors have found that use of the present invention results an a clarity of the surface of the aluminum chrome plated wheel that is at a level comparable to a surgical reflective mirror or a cosmetic mirror such as used in a compact or powder room.

Figure 1:
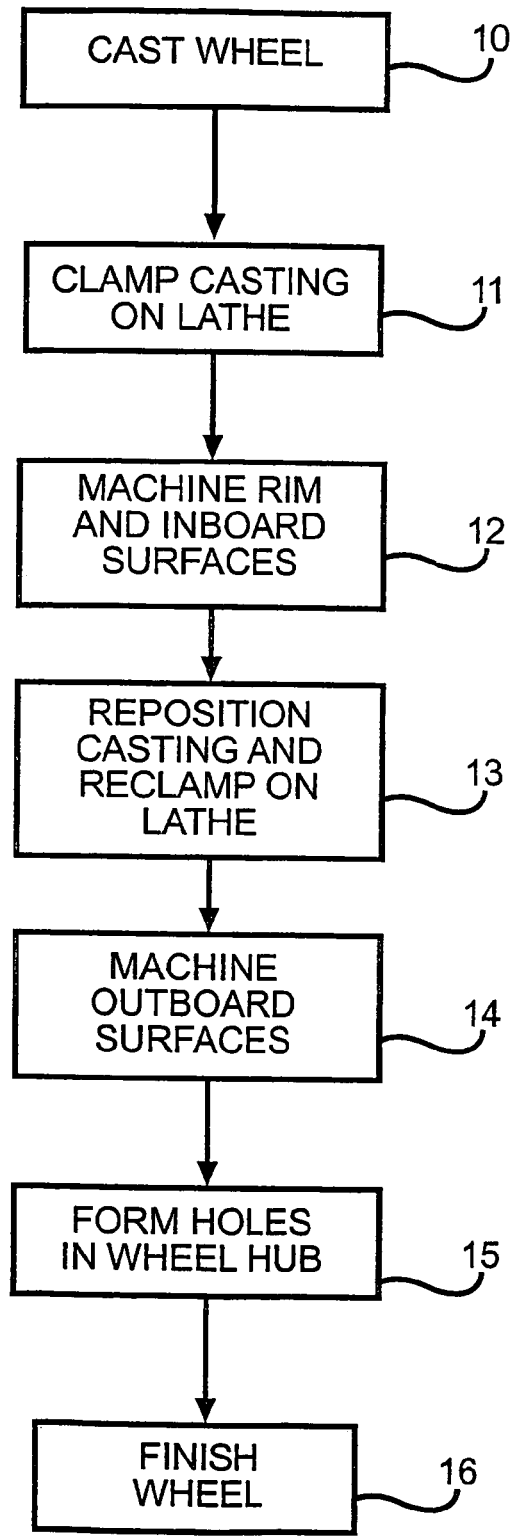
FIG. 1 is is a flow chart for a known process for manufacturing a one piece vehicle wheel.
Figure 2:
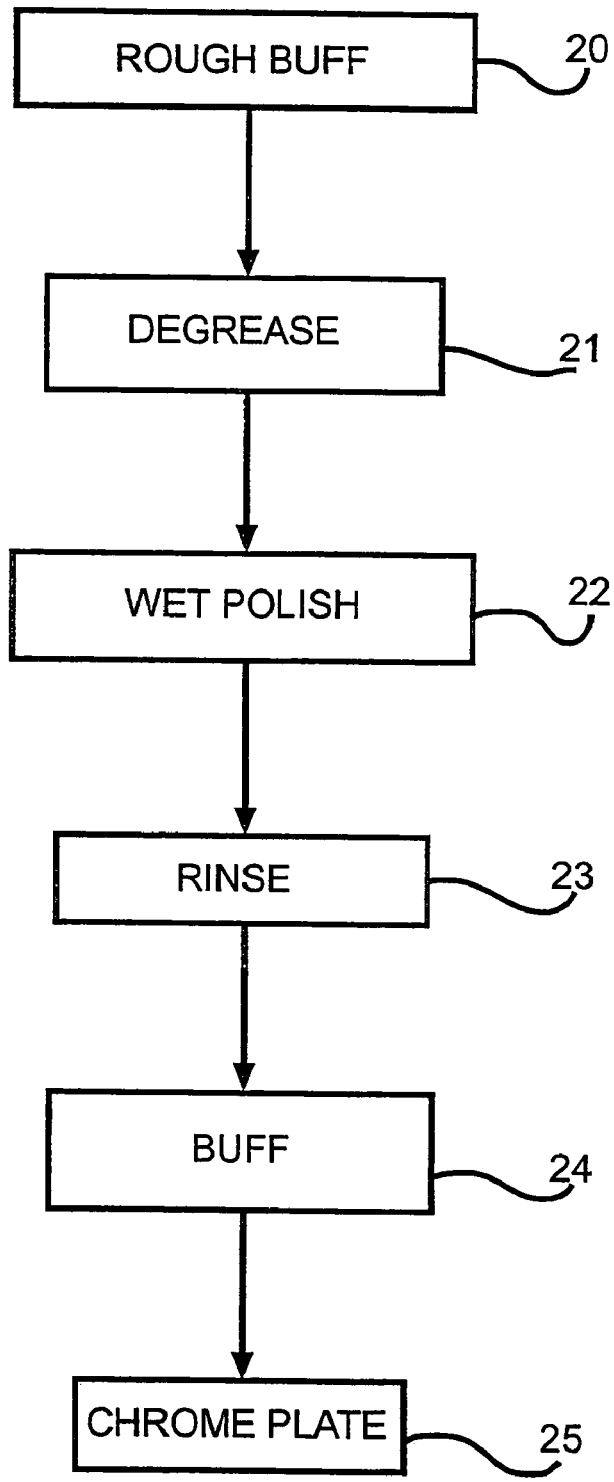
FIG. 2 is a flow chart for a known process for polishing and chrome plating a one piece vehicle wheel.
Figure 7:
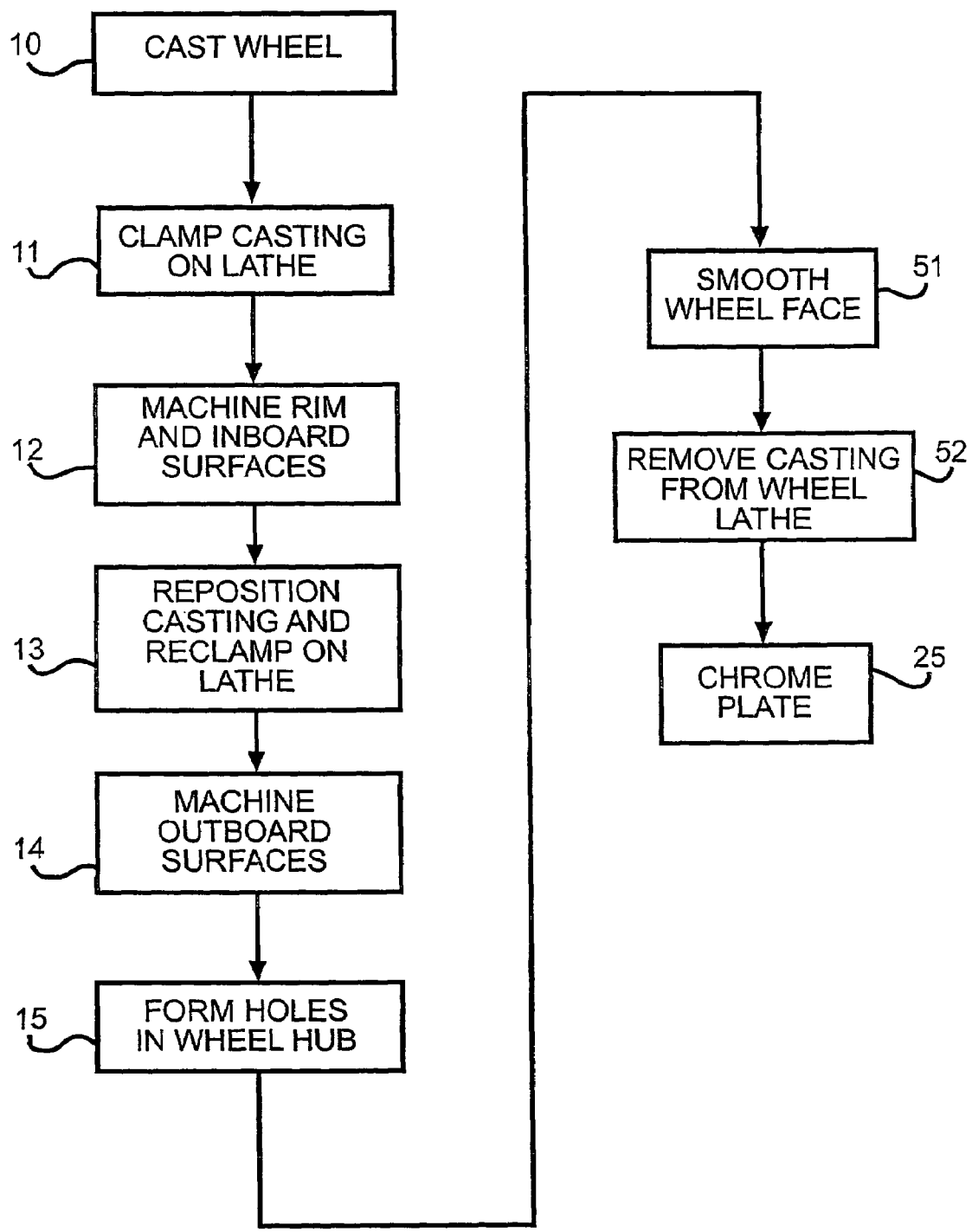
FIG. 7 is a flow chart for manufacturing a one piece vehicle wheel which utilizes the surface finishing process illustrated in FIG. 3.

The invention further contemplates a process for smoothing the wheel face that is illustrated by the flow chart shown in FIG. 7. Steps shown in FIG. 7 which are similar to steps shown in the flow charts in FIGS. 1 and 2 and have the same numerical designators. In FIG. 7, a vehicle wheel is cast by a conventional casting process, such as, for example, gravity or low pressure casting, in functional block 10. In functional blocks 11 through 15, the wheel casting is machined to a final shape as described above; however, a small amount of material is left for a final finishing cut with the special tool 40 described above.

In functional block 51, the outboard wheel face is smoothed on a wheel lathe or other conventional wheel finishing machine with a final finishing cut. The wheel is rotated upon the wheel lathe while a cutting tool having the unique geometry described above is urged against the outboard wheel face with a uniform cutting pressure while also being moved radially across the outboard wheel face. In the preferred embodiment, the depth of material removed by the tool 40 is within the range of 0.05 mm to 0.1 mm. Once the desired surface dimensions and finish have been achieved, the wheel is removed from the wheel lathe in functional block 52.

The wheel surface is then finished with one or more chrome plated layers deposited by a conventional chrome plating process in functional block 25. The present invention contemplates that smoothing is included as one of the steps in the prior art process for machining a wheel casting. For example, a cutting tool mounted upon a tool holder formed from an anti-vibration material can be added to the turret of the wheel lathe used to machine the wheel casting and the smoothing operation included as one of the programmed machining steps for finishing the wheel casting. Alternately, a smoothing station, which is dedicated to smoothing the wheel faces, can be established at the wheel manufacturing facility.

Figure 8:
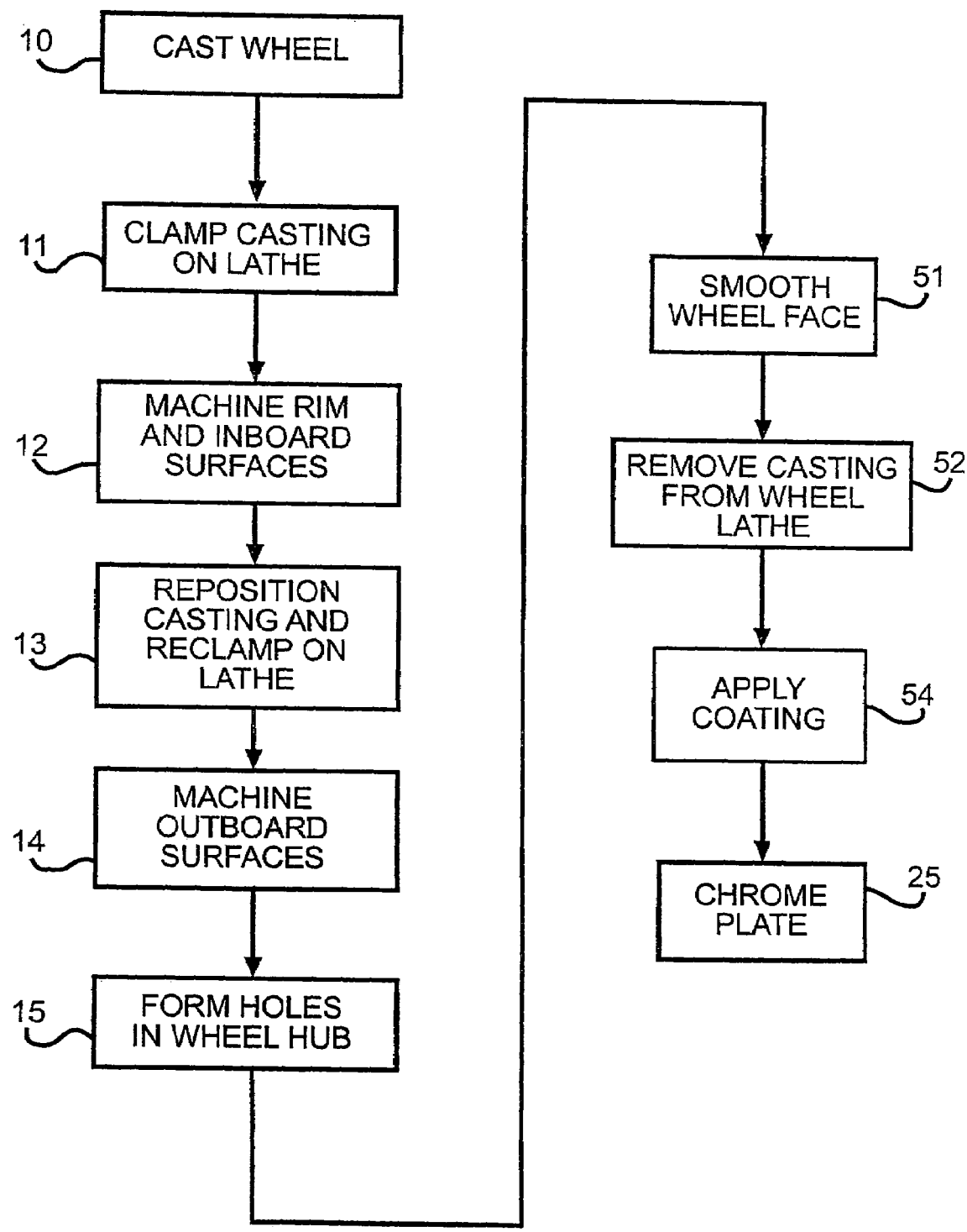
FIG. 8 is a flow chart for an alternate embodiment of the manufacturing process shown in FIG. 7.

While the preferred embodiment has been described and illustrated above as smoothing the entire outboard wheel face, it will be appreciated that only a portion of the wheel face can be smoothed. For example, the esthetic design of the wheel may require that only a portion of the wheel face is to be chrome plated with the remainder remaining as machined or painted. Accordingly, an alternate embodiment of the manufacturing process described above is illustrated by the flow chart shown in FIG. 8. As before, blocks shown in FIG. 8 that are similar to blocks shown in preceding figures have the same numerical designators. In FIG. 8, only the portion which is desired to be chrome plated is smoothed in functional block 51 by a final finishing cut with the special tool 40. Therefore, the portions of the wheel surface that are not to be chrome plated are machined to their final dimensions in functional block 14. As before, the wheel is removed from the wheel lathe in functional block 52. An electrically non-conductive coating is applied to the non-smoothed portions of the wheel in functional block 54. In the preferred embodiment, the portions of the wheel surface that were smoothed in functional block 51 are masked before the coating is applied. For example, the portions of the wheel surface adjacent to the windows formed between the wheel spokes may be coated while the remainder of the wheel face is chrome plated. Also in the preferred embodiment, the coating is a paint that includes pigment to add color to the coated area. Alternately, the wheel surface can be covered with a clear coating or the coating may include both a layer of paint and a layer of clear coat that covers the paint. It is further contemplated that the coating may include an inert ingredient to further enhance the appearance of the wheel. In the preferred embodiment, the coating is sprayed onto the wheel surface and then cured. Once the coating has cured, the masking material is removed. Alternately, a spraying mask may be used to in place of masking material to control the application of the coating to the wheel surface. Finally, in functional block 25, the wheel is chrome plated by a conventional process, such as by electrolysis with immersion in a tank. Upon immersion, the electrically non-conductive coating prevents adhesion of the chrome plating chemicals. Instead, the chrome plating chemicals only adhere to the bare metal portions of the wheel surface.

Figure 9:
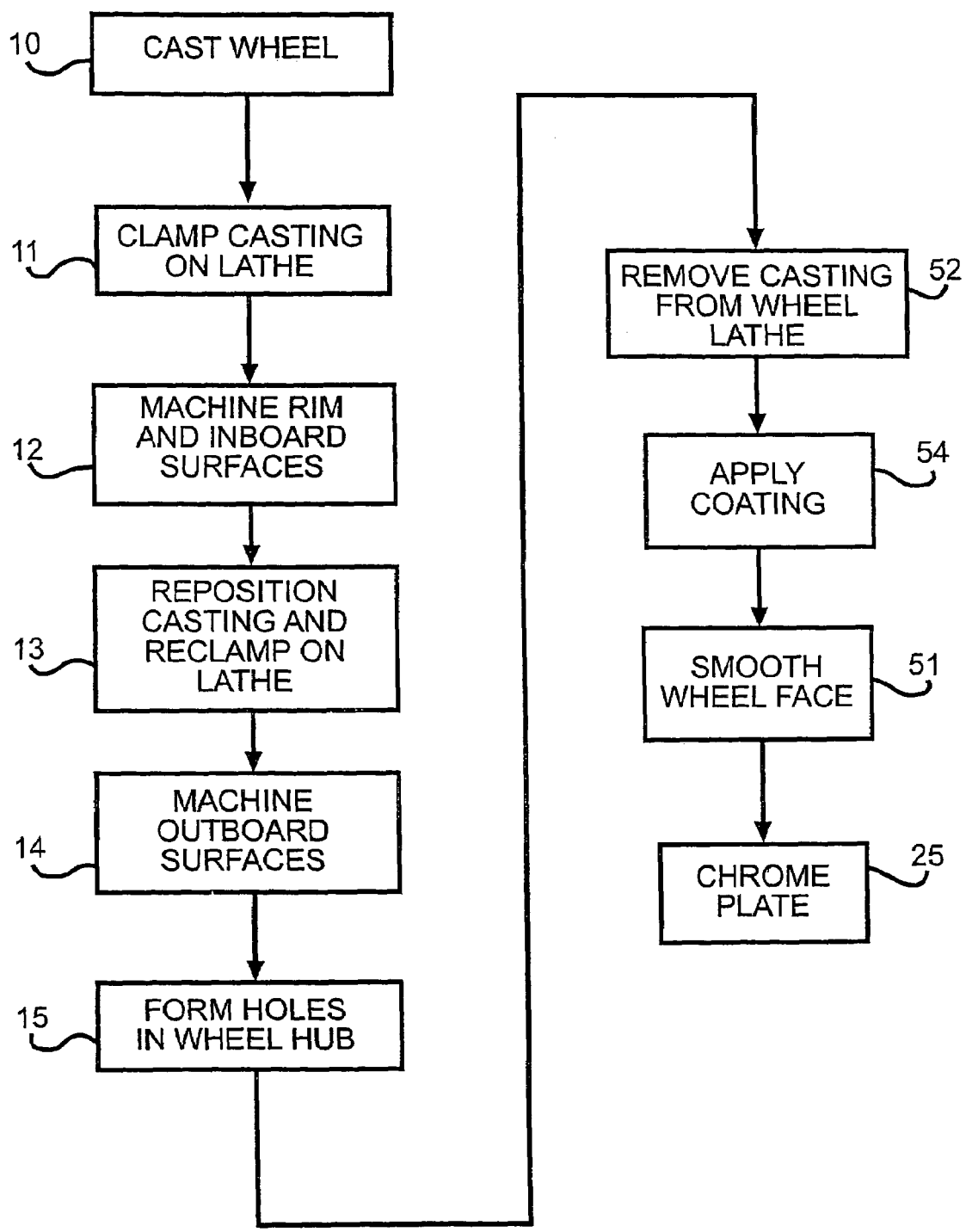
FIG. 9 is a flow chart for another alternate embodiment of the manufacturing process shown in FIG. 7.

Another alternate manufacturing process is illustrated in FIG. 9, where, as before, blocks that are similar to blocks shown in preceding figures have the same numerical designators. In FIG. 9, the coating is applied to the wheel in functional block 54 before the portions of the wheel face are smoothed with the special tool 40 in functional block 54. In the preferred embodiment, the entire wheel face is coated in functional block 54. Then, when the portions of the wheel surface to be chrome plated are smoothed by the special tool 40 in functional block 51, the tool 40 removes the coating from the portions of the face of the wheel to be chrome plated as it smoothes them. Thus, it is not necessary to mask portions of the wheel. As before, an electrically non-conductive material is sprayed onto the wheel face in functional block 54 and then cured. As described above, the coating material can be a paint that includes pigment, a clear coat or multiple layers of paint and clear coat. Additionally, an inert ingredient may be added to the coating material to further enhance the appearance of the wheel. Alternately, as described above, masking material or a spray mask can be used to restrict the coating material to only the portions of the wheel surface that are not to be chrome plated. Once the coating is cured, the portions of the wheel face that are to be chrome plated are smoothed in functional block 51 by a final finishing cut with the special tool 40. Then, in functional block 25, the wheel is chrome plated by a conventional process, such as by electrolysis with immersion in a tank. Upon immersion, the electrically non-conductive coating prevents adhesion of the chrome plating chemicals. Instead, the chrome plating chemicals only adhere to the bare metal portions of the wheel surface.

The invention also contemplates that the entire surface of wheel can be smoothed to provide an improvement in the cosmetic appearance to the wheel. Also, while the preferred embodiment has been described as being applied to cast wheels, it will be appreciated that the cosmetic appearance of wheels formed by other conventional processes also can be improved by application of the present invention. For example, the present invention also contemplates smoothing the outboard surface of forged or stamped wheel discs. Additionally, while the preferred embodiment has been illustrated and described for aluminum or aluminum alloy wheels, it will be appreciated that the invention also may be practiced on wheels formed from other metals and alloys of other metals. Finally, a layer of clear coat may be optionally applied to the chrome plated surface (not shown).

The inventors expect that using the improved cutting tool to cut and smooth the wheel face to enhance the cosmetic appearance thereof will cost less than buffing or polishing of the wheel face. Also, because the wheel can be smoothed on existing wheel lathes, no capital cost for polishing machines is required. The smoothing process eliminates both the exposure of personnel to toxic substances utilized during polishing and the expense of disposing of the toxic wastes generated thereby. Production time and cost will also be reduced since the need to ship the wheel to a polishing contractor will be eliminated. The improved cutting tool can extend into the wheel rim to reach the surface of a recessed wheel disc, which can be difficult to reach with polishing wheels. The cutting and smoothing preserves crisp edge surfaces which may be aesthetically desirable. Such edges tend to be blunted or removed by the abrasive nature of the polishing process. While polishing tends to highlight surface imperfections, cutting and smoothing tends to hide such surface imperfections. Finally, as described above, the present invention results in a significantly improved surface appearance and a greatly enhanced appearance of any chrome plating applied over the smoothed surface.

Figure 10:
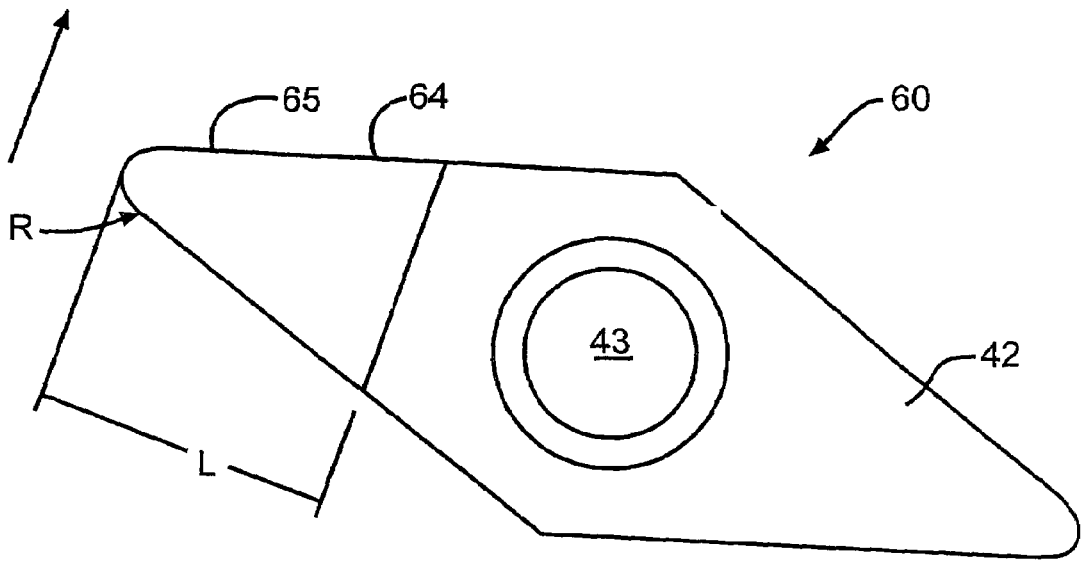
FIG. 10 is an alternate embodiment of the wheel surface finishing tool shown in FIG. 4.
Figure 11:
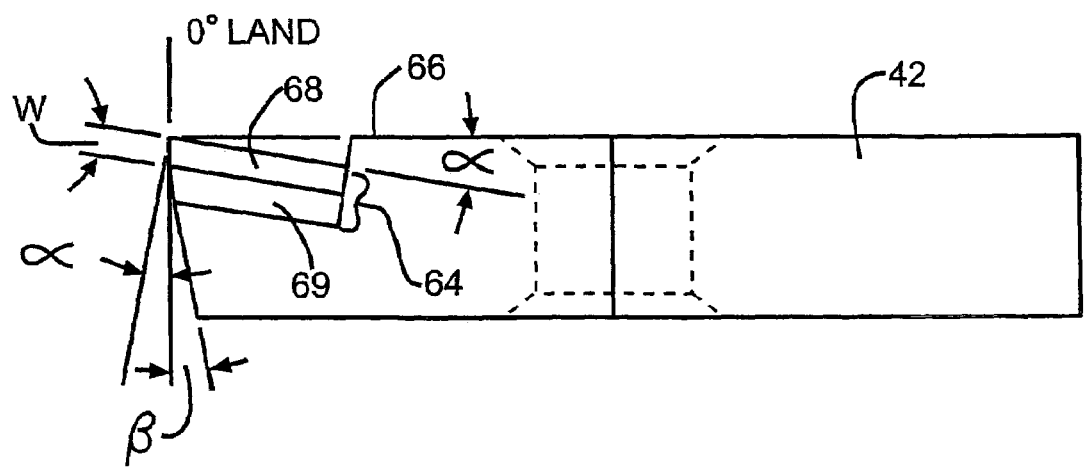
FIG. 11 is a side elevation of the surface finishing tool shown in FIG. 10.

The invention also contemplates an alternate embodiment of the special smoothing tool 60 that is illustrated generally at 60 in FIGS. 10 and 11. Components shown in FIGS. 10 and 11 that are the same as components shown in previous figures have the same numerical identifiers. The tool 60 has a rhombic shaped body 42 having a bore 43 formed therethrough which receives a fastener (not shown) for securing the tool to the tool holder 41. The tool 40 is formed from a sintered carbide steel and includes an insert 64 attached to one end. The insert 64 is formed from a mono crystalline material which may be either naturally occurring or synthetically produced. In the preferred embodiment, the insert 64 is formed from a Single Crystalline Diamond (SCD) material. The insert 64 includes an improved cutting tip 65 on one end that contacts the wheel face 31 and works the metal. The arrow in the upper left portion of FIG. 10 indicates the direction of movement of the worked metal, or the wheel, relative to the smoothing tool 40. As before, the insert 64 has a length L of about six mm.

Use of a mono crystalline insert 64 in place of the poly crystalline insert 44 described above significantly reduces the cost or the insert. Additionally, the use of a mono crystalline material allows a cutting tip 65 that is symmetrical about the centerline of the tool. In the preferred embodiment, the radius of the cutting tip, R, is formed in a ratio to the length of the tool 60 of about 1 to 16.

As best seen in FIG. 11, the insert 64 is canted at an angle α relative to the top surface 66 of the tool body 42. In the preferred embodiment, the angle α is seven degrees. A flat land 68 is formed around the upper edge of the insert 64. The land 68 is perpendicular, or has zero rake, to the tool body top surface 66. Because the insert 64 is canted relative to the tool body 42, the cutting edge of the insert 64 also forms an angle of α with the tool body top surface. Thus, the cutting tip 65 of the insert 64 is maintained tangent to the surface of the face of the vehicle wheel. The land 68 has a width W that is in the range of between 0.076 and 0.254 mm with the preferred embodiment having a width in the range of 0.076 to 0.127 mm. The lower portion 69 of the insert 64 and the tool body 42 are undercut at an angle β to allow removal of the cut material. The angle β is in the range of five to 15 degrees and is five degrees in the preferred embodiment.

Similar to the poly crystalline insert 44 described above, the present invention contemplates that, in the preferred embodiment, the feed rate per revolution for a wheel lathe utilizing the tool 60 having the mono-crystalline insert 64 is less that the cutting tip radius R.

The invention also contemplates applying a poly or mono crystalline coating to a substrate to form the tool insert (not shown). The inventors believe that either a diamond or ceramic coating may be utilized. The coating would be applied either before or after the geometry of the cutting tip is formed.

The invention further contemplates applying a layer of clear coating over the entire outboard surface of the wheel to include the chrome plated portion (not shown); however, this step is optional.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the preferred embodiment has been described for a one piece vehicle wheel, it will be appreciated that the invention also can be practiced upon two piece vehicle wheels having cast full face modular wheel discs. Also, the invention can be practiced upon a wheel spider which is disposed within a wheel rim.

What is claimed is:

1. A cutting tool for smoothing a wheel surface comprising:
    a body; and
    a non-symmetrical cutting tip formed upon one end of the body portion, said cutting tip having adjoining arcuate leading and trailing edges, said leading edge having a convex share with a leading edge radius and said trailing edge also having a convex shape with a trailing edge radius, said leading edge radius being greater than said trailing edge radius, said cutting tip also having a zero degree land formed thereabout whereby a cutting edge of the tool is maintained tangent to a surface of the wheel.

2. The cutting tool according to claim 1 wherein said body has a rhombic shape and further wherein said body also has a mounting aperture formed therethrough.

3. The cutting tool according to claim 1 wherein said cutting tip is formed upon an insert carried upon one end of said body portion.

4. The cutting tool according to claim 3 wherein said insert is formed from a hard substance.

5. The cutting tool according to claim 4 wherein said insert is formed from a poly-crystalline material.

6. The cutting tool according to claim 4 wherein said insert is formed from a mono-crystalline material.

7. The cutting tool according to claim 3 wherein said insert is coated with a hard material.

8. The cutting tool according to claim 7 wherein said coating material is one of a diamond and ceramic substance.

9. The cutting tool according to claim 3 wherein said leading edge radius is twice said trailing edge radius.

10. The cutting tool according to claim 3 wherein said end of said body adjacent to said tip is undercut by an angle in the range of five to 15 degrees.

11. The cutting tool according to claim 10 wherein said insert is canted relative to a surface of said tool body.

12. The cutting tool according to claim 11 further including a tool holder formed from an anti-vibration material.

13. The cutting tool according to claim 1 wherein said working tip is formed from a hard substance.

14. The cutting tool according to claim 13 wherein said working tip is formed from a poly-crystalline material.

15. The cutting tool according to claim 13 wherein said working tip is formed from a mono-crystalline material.

16. The cutting tool according to claim 1 wherein said working tip is coated with a hard material.

17. The cutting tool according to claim 16 wherein said coating material is one of a diamond and ceramic substance.

18. The cutting tool according to claim 1 wherein said leading edge radius is twice said trailing edge radius.

19. The cutting tool according to claim 1 wherein said end of said body adjacent to said tip is undercut by an angle in the range of five to 15 degrees.

20. The cutting tool according to claim 19 wherein said working tip is canted relative to a surface of said tool body.

21. The cutting tool according to claim 20 further including a tool holder formed from an anti-vibration material.

22. A process for forming a decorative surface upon a wheel surface, the method comprising the steps of:
  (a) providing a cutting tool for smoothing at least a portion of the wheel surface that includes a body having a mounting aperture formed therethrough and a cutting tip formed upon one end of the body portion, the cutting tip having arcuate leading and trailing edges, the cutting tip also having a zero degree land formed thereabout whereby the cutting edge of the tool is maintained tangent to the wheel surface.
  (b) mounting a machined vehicle wheel upon a lathe;
  (c) rotating the wheel; and
  (d) urging the cutting tool provided in step (a) with a uniform pressure against a surface of the wheel and traversing the cutting tool across the surface of the wheel to smooth at least a portion of the wheel surface such that the smoothed portion of the wheel surface has a polished appearance.

23. The process according to claim 22 wherein the tool provided in step (a) includes a non-symmetrical working tip having arcuate leading and trailing edges, the leading edge having a leading edge radius and the trailing edge having a trailing edge radius, the leading edge radius being greater than the trailing edge radius.

24. The process according to claim 23 wherein step (d) includes a rate of feed per revolution of the lathe that is less than the leading edge radius of the cutting tool.

25. The process according to claim 24 wherein step (d) includes a rate of feed per revolution of the lathe that is one tenth of the leading edge radius of the cutting tool.

* * * * *

UNITED STATES PATENT AND TRADEMARK OFFICE
CERTIFICATE OF CORRECTION

| | | |
|---|---|---|
| PATENT NO. | : 7,140,949 B2 | Page 1 of 1 |
| APPLICATION NO. | : 11/110650 | |
| DATED | : November 28, 2006 | |
| INVENTOR(S) | : Geoffrey L. Gatton et al. | |

It is certified that error appears in the above-identified patent and that said Letters Patent is hereby corrected as shown below:

Column 10, Claim 1, Line 27, delete "share" and insert --shape--.

Signed and Sealed this

Twentieth Day of February, 2007

JON W. DUDAS
*Director of the United States Patent and Trademark Office*